(12) United States Patent
Turner et al.

(10) Patent No.: US 11,733,719 B2
(45) Date of Patent: Aug. 22, 2023

(54) USER ACCESS MANAGEMENT FOR DISPENSING PARTICULATE MATERIAL

(71) Applicant: CNH Industrial Canada, Ltd., Saskatoon (CA)

(72) Inventors: Jack Turner, Saskatoon (CA); Gord Engel, Saskatoon (CA)

(73) Assignee: CNH INDUSTRIAL CANADA, LTD., Saskatoon (CA)

( * ) Notice: Subject to any disclaimer, the term of this patent is extended or adjusted under 35 U.S.C. 154(b) by 1138 days.

(21) Appl. No.: 16/161,268

(22) Filed: Oct. 16, 2018

(65) Prior Publication Data

US 2020/0117221 A1   Apr. 16, 2020

(51) Int. Cl.
  *G05D 7/06*    (2006.01)
  *A01C 15/00*   (2006.01)
  *A01C 7/08*    (2006.01)

(52) U.S. Cl.
  CPC ............ *G05D 7/0611* (2013.01); *A01C 7/08* (2013.01); *A01C 15/005* (2013.01); *G05B 2219/24167* (2013.01); *G05B 2219/36133* (2013.01)

(58) Field of Classification Search
  None
  See application file for complete search history.

(56) References Cited

U.S. PATENT DOCUMENTS

| | | | |
|---|---|---|---|
| 6,856,878 B2 | 2/2005 | Braunhardt et al. | |
| 6,998,956 B2 | 2/2006 | Dix | |
| 7,139,660 B2 | 11/2006 | Sarkar et al. | |
| 7,225,060 B2 | 5/2007 | O'Connor et al. | |
| 8,502,647 B2 | 8/2013 | Seitz et al. | |
| 8,514,055 B2 | 8/2013 | Ishikawa | |
| 8,825,222 B2 | 9/2014 | Namburu et al. | |
| 8,847,936 B2 | 9/2014 | Chervenka et al. | |
| 8,948,926 B2 | 2/2015 | Erickson | |
| 9,051,710 B2 | 6/2015 | Jones et al. | |
| 9,144,190 B2 * | 9/2015 | Henry | A01C 7/044 |
| 9,275,208 B2 | 3/2016 | Protopapas | |
| 9,299,247 B2 | 3/2016 | O'Neal et al. | |
| 9,434,332 B2 | 9/2016 | Jost et al. | |
| 2004/0199274 A1 * | 10/2004 | Hegmann | G06F 3/0233 |
| | | | 700/83 |
| 2011/0191213 A1 * | 8/2011 | Mora | G06Q 40/12 |
| | | | 726/28 |
| 2012/0001876 A1 * | 1/2012 | Chervenka | G07C 5/00 |
| | | | 345/204 |

(Continued)

*Primary Examiner* — Mohammad Ali
*Assistant Examiner* — David Earl Ogg
(74) *Attorney, Agent, or Firm* — Rebecca Henkel; Rickard DeMille (57) ABSTRACT

The present inventors have determined that implementation of an authentication process which can be selectively applied to safeguard parameters which modify dispensing of particulate material during agricultural operations can advantageously allow users of varying levels of experience and understanding to maintain ease of conducting field operations while reducing the possibility of waste and expense. A control system can determine a level of access for an operator or user on an individual basis. Upon determining a level of access for the operator to be sufficient for modifying a parameter, the control system can apply an input from the operator to modify the parameter, and can accordingly adjust dispensing of particulate material.

20 Claims, 4 Drawing Sheets

(56) References Cited

U.S. PATENT DOCUMENTS

| | | | |
|---|---|---|---|
| 2012/0124500 A1* | 5/2012 | Hunter | H05B 47/19 |
| | | | 715/767 |
| 2015/0025705 A1 | 1/2015 | Burger | |
| 2015/0180710 A1 | 6/2015 | Cazanas et al. | |
| 2015/0267719 A1* | 9/2015 | Gorman | E02F 9/2066 |
| | | | 60/327 |
| 2016/0120097 A1* | 5/2016 | Chahley | A01C 21/005 |
| | | | 701/50 |
| 2016/0135359 A1* | 5/2016 | Kowalchuk | A01C 21/00 |
| | | | 111/149 |
| 2019/0021221 A1* | 1/2019 | Roberge | B01F 33/404 |

\* cited by examiner

# USER ACCESS MANAGEMENT FOR DISPENSING PARTICULATE MATERIAL

FIELD OF THE INVENTION

The present invention relates generally to systems for distributing particulate material to agricultural fields, and more particularly, to such systems controlled to determine a level of access for an operator providing the input and, upon determining the level of access to be sufficient for modifying a parameter, applying the input to modify the parameter to adjust a metering rate according to the parameter as modified.

BACKGROUND OF THE INVENTION

Generally, a tractor or work vehicle tows seeding or fertilizing implements via a hitch assembly that connects to a rigid frame of a planter, seeder or fertilizer applicator. These crop production systems typically include one or more delivery lines that carry particulate material, such as seed or fertilizer. In certain systems, ground engaging tools are used to break the soil to deposit the particulate material carried by these delivery lines. After depositing the particulate material, each ground engaging tool is typically followed by a packer wheel that packs the soil on top of the deposited material. For other crop production systems, particulate material may simply be spread onto the crops. In certain systems, an air cart is also used to meter and deliver the particulate material through the particulate delivery lines to the soil.

Agricultural managers oftentimes rely on many different users to operate such equipment in the field. However, the users may have varying levels of experience and understanding for conducting what are increasingly complex agricultural operations. For example, a simple change through controls of the equipment, such as modifying a calibration setting, could inadvertently result in a change to the dispensing rate for particulate material in the field, thereby resulting in unnecessary waste and expense. What is needed is an improved system for agricultural operations which is more conducive to accommodating users of varying levels of experience and understanding.

SUMMARY OF THE INVENTION

The present inventors have determined that implementation of an authentication process which can be selectively applied to safeguard parameters which modify dispensing of particulate material during agricultural operations can advantageously allow users of varying levels of experience and understanding to maintain ease of conducting field operations while reducing the possibility of waste and expense. A control system can determine a level of access for an operator or user on an individual basis. Upon determining a level of access for the operator to be sufficient for modifying a parameter, the control system can apply an input from the operator to modify the parameter, and can accordingly adjust dispensing of particulate material.

In one aspect, access to various parts of operator controlled functions which. manage agricultural equipment can be locked out. This can prevent inadvertent changes by an inexperienced operator. Farm managers can program the machines and only allow operators limited access to the control systems. Control software can be changed to provide the ability to password protect functions and/or screens. In addition, user defined views can be unique to an operator ID. Also, telematics can be used to access functions and/or screens remotely. Also, an operator could be limited to adjusting some parameters within a limited predefined range.

Specifically then, one aspect of the present invention can provide a system for distributing particulate material to an agricultural field, including: a meter module configured to dispense particulate material through a product distribution system, the meter module being controllable to dispense the particulate material at a metering rate that is adjustable; an input source configured to receive an input from an operator for modifying a parameter used for determining the metering rate; and a controller in communication with the meter module and the input source, the controller executing a program stored in a non-transient medium to: determine a level of access for the operator providing the input; and upon determining the level of access to be sufficient for modifying the parameter, apply the input to modify the parameter, and adjust the metering rate according to the parameter as modified.

Another aspect of the present invention can provide a method for distributing particulate material to an agricultural field, including: controlling a meter module to dispense particulate material through a product distribution system at a metering rate that is adjustable; receiving an input from an operator for modifying a parameter used for determining the metering rate; determining a level of access for the operator providing the input; and upon determining the level of access to be sufficient for modifying the parameter, applying the input to modify the parameter, and adjusting the metering rate according to the parameter as modified.

Another aspect of the present invention can provide a system for distributing particulate material to an agricultural field, including: an air cart including: a product storage tank configured to store particulate material; and a meter module configured to dispense the particulate material from the product storage tank to a primary product distribution line, the meter module being controllable to dispense the particulate material at a metering rate that is adjustable; an agricultural implement including: a product distribution header configured to receive the particulate material from the air cart through the primary product distribution line; and multiple row units, each row unit being configured to receive the particulate material from the product distribution header through a secondary product distribution line and deposit the particulate material to the agricultural field; an input source configured to receive an input from an operator for modifying a parameter used for determining the metering rate; and a controller in communication with the meter module and the input source, the controller executing a program stored in a non-transient medium to: determine a level of access for the operator providing the input; and upon determining the level of access to be sufficient for modifying the parameter, apply the input to modify the parameter, and adjust the metering rate according to the parameter as modified. aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
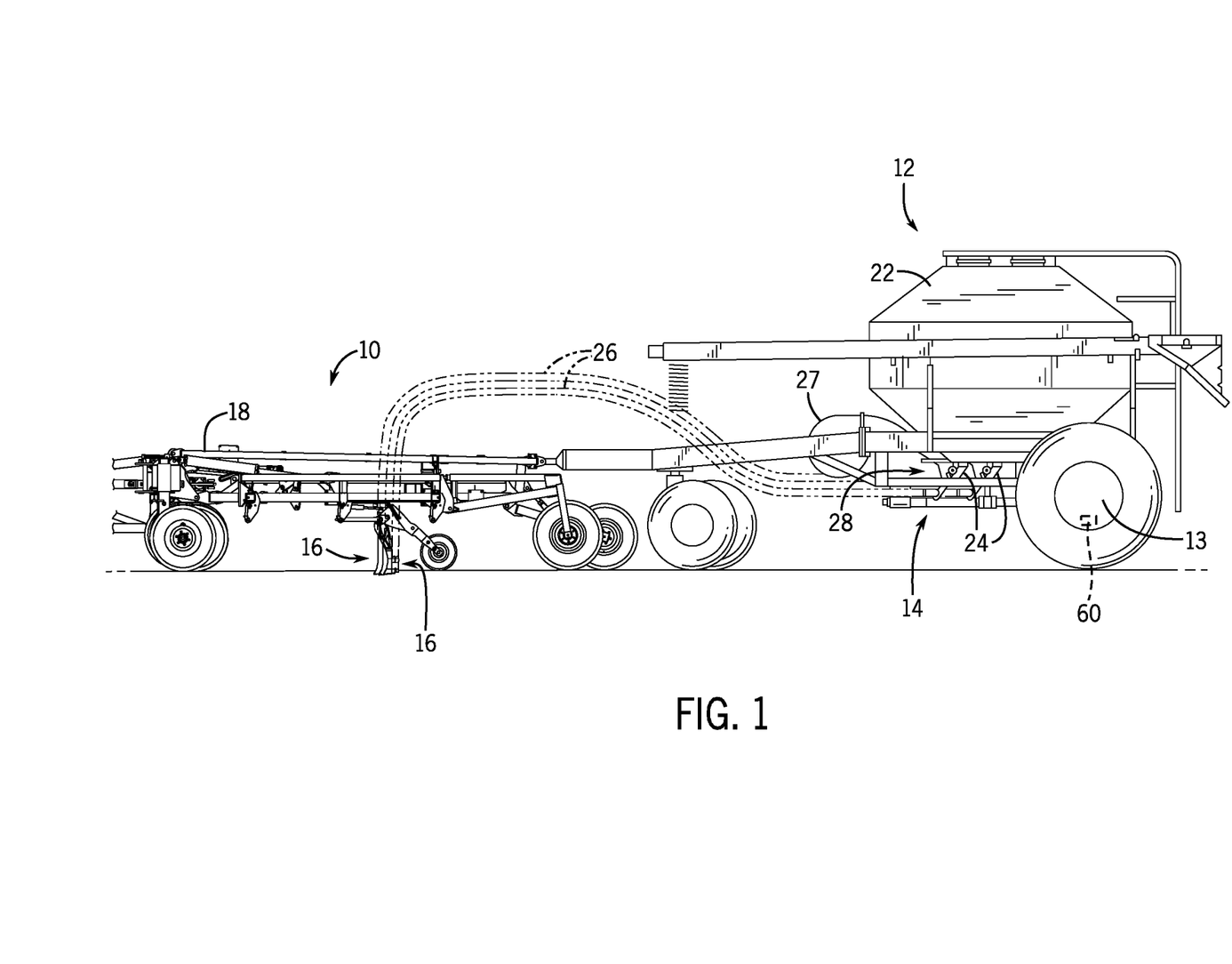
FIG. 1 is a side view of an agricultural implement coupled to an air cart having a control system in accordance with an aspect of the present invention.

Referring now to the drawings and specifically to FIG. 1, a side view of an exemplar agricultural implement 10, which may be a seeding implement or tool, coupled to an air cart 12 having a metering system 14 is provided in accordance with an aspect of the invention. The implement 10 includes multiple row units 16 supported by a frame 18. Each row unit 16 is configured to receive agricultural product, such as seed or fertilizer, from the metering system 14 of the air cart 12 and to deposit the agricultural product into the soil as the implement 10 travels across a field. As shown, the air cart 12 is coupled to the implement 10 via the frame 18. The air cart 12 may be supported by wheels 13. The air cart 12 may include one or more product storage tanks 22 configured to store one or more agricultural products. Each product storage tank 22 is coupled to a corresponding metering subassembly 28, which includes multiple meter modules 24 each coupled to a corresponding primary product distribution line 26 (primary lines) that is configured to distribute agricultural product to one or more corresponding row units 16 of the implement 10. In particular, an air source 27 is provided to provide an air flow to each of the primary lines 26. The metered agricultural product is entrained within the air flow and pneumatically transferred to the one or more corresponding row units 16 of the implement 10. While two meter modules 24 and two primary lines 26 are shown for clarity, it should be appreciated that, in certain aspects each metering subassembly 28 may include at least 4, 6, 8, 9, 10, 12, or more meter modules 24 and/or primary lines 26. Furthermore, one meter module 24 may provide the agricultural product to one or more primary lines 26 (such as a subset of the primary lines 26). Additionally, while two row units 16 are shown for clarity, it should be appreciated that, in certain aspects the implement 10 may include at least 4, 6, 8, 9, 10, 20, 30, 40, 50, 60, 70, 80, 90, 96, or more row units 16, and furthermore, that each primary line 26 may provide the agricultural product to any suitable number (such as 1, 2, 3, 4, 5, 6, 7, 8, 9, 10, or more) of row units 16 and/or any suitable number of outlets configured to deposit product into the field. Similarly, while one product storage tank 22 is illustrated, it should be appreciated that, in certain aspects the air cart 12 may include at least 2, 3, 4, 5, 6 or more product storage tanks 22. In FIG. 1, the air cart 12 is coupled to the implement 10, and towed behind the implement 10. As will be appreciated, in certain aspects, the air cart 12 may be towed directly behind a tow vehicle, with the implement 10 towed behind the air cart 12. Likewise, the implement 10 and the air cart 12 may be part of a single unit, or the implement 10 and the air cart 12 may be separate units that are coupled together.

The metering system 14 is configured to receive various inputs, such as a prescription rate map, and to control each of the multiple meter modules 24 individually (separately) based on the inputs. For example, in some cases, it may be desirable to apply the agricultural product at a first rate to one region of a field and to apply the agricultural product at a second rate, different from the first rate, to another region of the field. The metering system 14 may be configured to receive inputs indicative of the desired product application rates across the field (such as from an electronic prescription map) and to determine appropriate metering rates (such as meter roller turn rates or rotational speed) for each of the meter modules 24. The metering system 14 may then separately control each of the meter modules 24 to meter the agricultural product at the respective appropriate metering rate such that the agricultural product is applied via the ground engaging tools 16 at the desired product application rate within each region as the implement 10 travels across the field.

Figure 2:
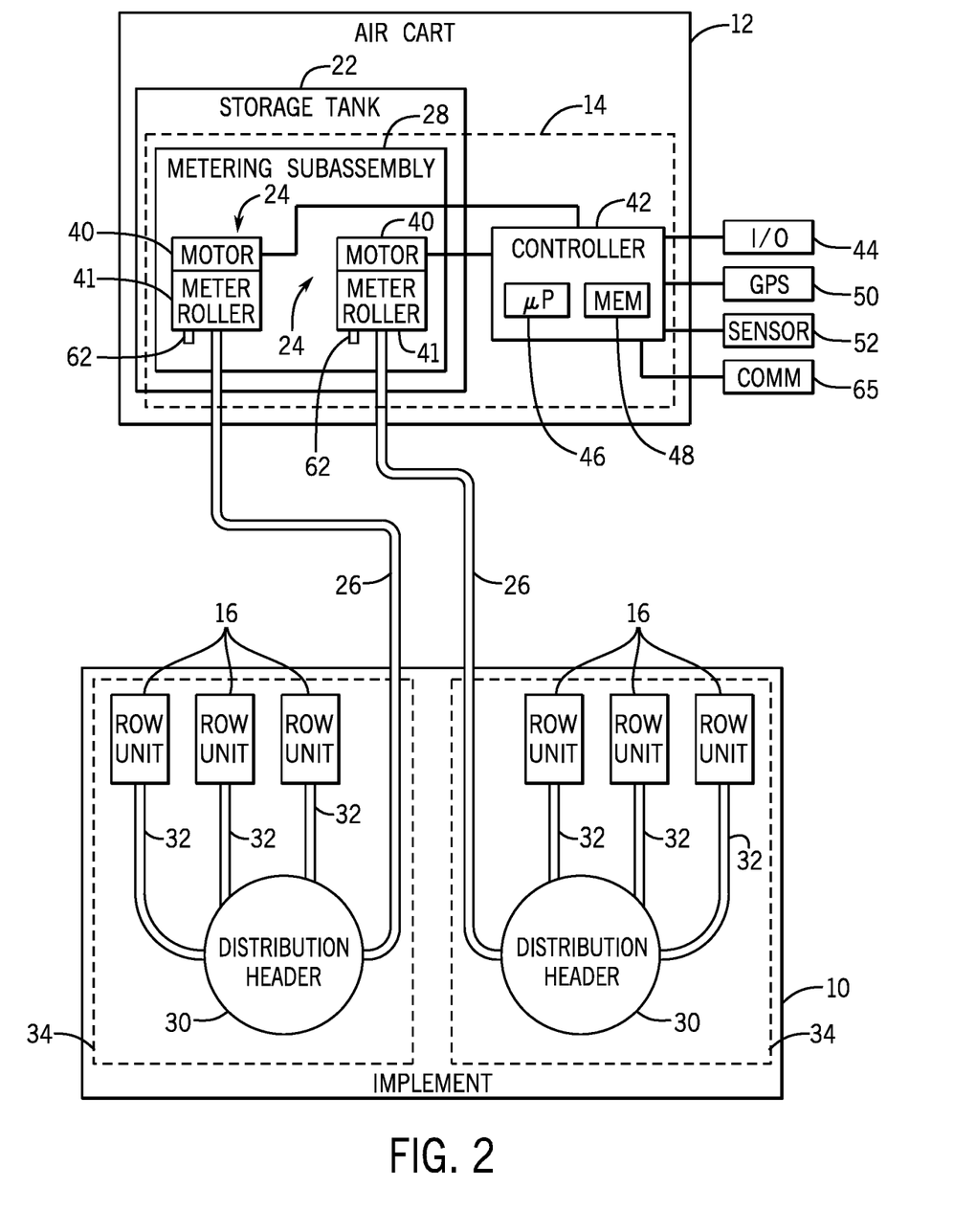
FIG. 2 is a schematic diagram of a portion of an aspect of the agricultural implement and the air cart of FIG. 1.

FIG. 2 is a schematic diagram of a portion of an aspect of the implement 10 and the air cart 12. To facilitate discussion, one product storage tank 22 and its corresponding metering subassembly 28 is shown. However, it should be understood that the air cart 12 may include any suitable number of storage tanks 22, and the metering system 14 may provide one metering subassembly 28 for each storage tank 22. As shown, the metering subassembly 28 includes two meter modules 24 (such as a first meter module and a second meter module), although the metering subassembly 28 may include any suitable number of meter modules 24, as noted above. In the illustrated aspect, each meter module 24 is configured to meter the agricultural product into a corresponding primary line 26. Additionally, each primary line 26 is configured to direct the agricultural product to a distribution header 30 of the implement 10, and the distribution header 30 is configured to distribute the agricultural product into one or more corresponding secondary lines 32 extending to a corresponding row unit 16. Each meter module 24 and corresponding primary line 26 may thus provide agricultural product to separate sections 34 (such as a first section and a second section) of the implement 10. Because each meter module 24 may be separately controlled, the row units 16 of one section 34 may apply the agricultural product at a different rate than the row units 16 of another section 34. Thus, the agricultural product may be applied at different rates across a width of the implement 10, and the application rate provided by each section 34 may be adjusted independently as the implement 10 travels across the field. As noted above, it should be appreciated that although each meter module 24 is shown coupled to a single corresponding primary line 26, in some aspects, each meter module 24 may be coupled to two or more primary lines 26, and thus may deliver product to two or more sections 34 (such as a subset of sections 34), for example.

As shown, each meter module 24 includes an actuator 40 (such as a motor) configured to actuate or drive rotation of a respective meter roller 41 (meter). In some aspects, each motor 40 may drive rotation of a drive shaft coupled to the respective meter 41. Although each meter module 24 includes the motor 40, in some aspects, the respective meter roller 41 of each meter module 24 may be driven into rotation via any suitable mechanism. The metering system 14 also includes a controller 42 that may be located on the air cart 12 and/or be communicatively coupled to each metering subassembly 28. The controller 42 is configured to control each motor 40 to adjust a metering rate (such as meter roller turn rate) of its respective meter module 24. In certain aspects, the controller 42 is an electronic controller having electrical circuitry configured to process signals (which can be signals indicative of input by a user, a prescription rate map and/or prescribed application rates, as well as position, speed, product delay, dimensions of the implement 10 and/or geometry of respective geographic regions of the field) from various sources, including an I/O 44 (input source), a global positioning system (GPS) sensor 50, sensor inputs 52 and/or a wireless communications system 65. Accordingly, with input from the various inputs, the controller 42 can determine metering rates for dispensing particulate material (such as, in units of mass per area) for various regions of the field. In doing so, the controller 42 may utilize target application rates from a prescription map, GPS position, metering calibration (such as units of mass applied per revolution of the meter roller 41) and sensing, ground speed calibration (such as targets detected per revolution of a disc connected to a wheel 13) and sensing, section width and/or geometry of respective regions of the field, to determine a rotational speed at which to drive the meter roller 41. In some aspects, the controller 42 may provide a speed command to each motor 40, which may have an internal processor configured to translate the speed command from the controller 42 and to vary the motor speed accordingly to achieve the desired dispensing rate.

In the illustrated aspect, the controller 42 includes a processor, such as microprocessor 46, and a memory device 48. The controller 42 may also include one or more storage devices and/or other suitable components. The processor 46 may be used to execute software, such as software for controlling the metering system 14.

The memory device 48 may include a volatile memory, such as random access memory (RAM), and/or a nonvolatile memory, such as ROM. The memory device 48 may store a variety of information and may be used for various purposes. For example, the memory device 48 may store processor-executable instructions (such as firmware or software) for the processor 46 to execute, such as instructions for controlling the metering system 14. The storage device(s) (e.g., nonvolatile storage) may include read-only memory (ROM), flash memory, a hard drive, or any other suitable optical, magnetic, or solid-state storage medium, or combination thereof. The storage device(s) may store data (such as a prescription rate map, location data, implement speed data, section width or the like), instructions (such as software or firmware for controlling the metering system 14), and any other suitable data. The processor 46 and/or memory device 48, or an additional processor and/or memory device, may be located in any suitable portion of the system. For example, a memory device storing instructions (such as software or firmware for controlling portions of the metering system 14) may be located in or associated with each motor 40.

The I/O 44 may be a Human Machine Interface (HMI) or Virtual Terminal (VT) computer allowing input from a user and having a processor and graphic display for outputting information to user via screens. The I/O 44 may communicate with other electronic modules of the system such as by way of a CAN bus. The controller 42 may be configured to receive signals from the I/O 44, such as signals indicative of a prescription rate map, or any other suitable data indicative of desired product application rates to different geographic regions of the field. For example, an operator may gain access to the controller 42 via the I/O 44 to generate and/or input a prescription rate map by prescribing (setting or assigning) various desired product application rates for various geographic regions of the field. The prescription rate map may be generated based on any suitable factors, such as previous yield (a yield map of respective geographic regions of the field determined during a previous planting season), soil conditions, type of agricultural product, or any combination thereof. As the implement 10 moves across the field, the controller 42 of the metering system 14 may also receive signals indicative of a geographic location of the implement 10 relative to the field via the GPS sensor 50, or any other suitable sensor. In some aspects, the GPS sensor 50 may be disposed on a tractor towing the implement 10, and the geographic location of the implement 10 and the various row units 16 and/or sections 34 relative to the field may be derived by the controller 42 based on data related to the location of these components relative to the GPS sensor 50 on the tractor. In certain aspects, the GPS sensor 50 may be disposed on the air cart 12 or the implement 10. In some cases, multiple GPS sensors 50 may be disposed on the implement 10, such as at each section 34 to facilitate determination of the geographic location of each row unit 16 and/or section 34 relative to the field as the implement 10 travels across the field.

Based on the prescription rate map and the geographic location of each row unit 16 and/or section 34, the controller 42 of the metering system 14 automatically determines an appropriate metering rate for each meter module 24 and adjusts each meter module 24 to the appropriate metering rate such that the agricultural product is applied according to the prescribed product application rate (such as the prescription rate map) for respective geographic regions of the field as the implement 10 travels across the field. As the disclosed aspects enable sectional control (each meter module 24 is independently controllable to provide the desired agricultural product flow rate to the corresponding section 34), the agricultural product may be more precisely applied according to the prescription rate map.

In certain aspects, the controller 42 of the metering system 14 may be configured to receive additional inputs to facilitate precise application of the agricultural product to the various geographic regions of the field at the prescribed rates. For example, as shown, the controller 42 may receive a signal indicative of a speed of the implement 10 from the GPS sensor 50 and/or from a separate ground speed sensor 60, which may be disposed at any suitable location, such as in connection with a wheel 13, via the sensor input 52. The ground speed sensor 60 could be configured to count targets on a disc which turns with the wheel 13 (calibrated for a distance travelled) versus time. The speed of the implement 10 may enable the controller 42 to determine when to adjust the meter module 24 such that the rate at which the product is applied to the field changes to the prescribed product application rate for a particular region as the row units 16 travel into that particular region. In certain aspects, additional data may be input or stored (e.g., within the memory

48) of the controller 42 to facilitate precise application of the agricultural product to the various regions of the field at the prescribed rates. For example, a product delivery time (such as a time for the agricultural product to travel from the meter module 24 to corresponding row units 16) may vary for each section 34 of the implement. For example, the time to deliver the agricultural product from the meter modules 24 to sections 34 disposed on laterally outward ends of the implement 10 may be greater than the time to deliver the agricultural product from the meter modules 24 to sections 34 disposed proximate to the air cart 12 (such as at a laterally inward position of the implement 10). Accordingly, the product delivery time for each section 34 may be input or stored (such as within the memory 48) of the controller 42 and may be utilized by the controller 42, in conjunction with the speed of the implement 10, to determine when to adjust the meter module 24 such that the rate at which the product is applied to the field changes to the prescribed product application rate for a particular region as the row units 16 travel into that particular region.

Also, the controller 42 may receive signals indicative of a speed of the meter modules 24 from meter rotation sensors 62, which may be disposed in connection with meter rollers 41, via the sensor input 52. The meter rotation sensors 62 could be configured to count targets on discs which turn with respective meter rollers 41 (calibrated for a unit of mass applied for dispensing particulate material per revolution of the meter roller 41). The speed of the meter rollers 41 may enable the controller 42 to determine metering rates for the meter modules 24. Accordingly, the controller 42 can adjust metering rates of the meter module 24, with feedback, as desired for operation in the agricultural field.

In accordance with an aspect of the invention, an authentication process can be selectively applied to safeguard parameters which modify metering (dispensing) of particulate material during agricultural operations. Such parameters may include, for example, meter calibration for the meter module 24, ground speed calibration, selection of particulate material (which may have different masses), and/or configurations of the product distribution system, such as the number of distribution headers 30, the number of primary lines 26, the number of secondary lines 32, a dimension of the product distribution system, such as tool or section width, and the like. This can advantageously allow users of varying levels of experience and understanding to maintain ease of conducting field operations while reducing the possibility of waste of particulate material and related expense. In one aspect, upon receiving an input from an operator, either at the machine, such as from the I/O 44, or remotely, such as from the wireless communications system 65, for modifying a parameter used for determining the metering rate, the controller 42 can execute to determine a level of access for the operator providing the input. This may be done, for example, by comparing permission levels of an operator, based on unique operator identification numbers (operator ID's), to a data. structure, Upon determining the level of access to be sufficient for modifying the parameter, the controller 42 can execute to apply the input to modify the parameter, and adjust the metering rate according to the parameter as modified.

Figure 3:
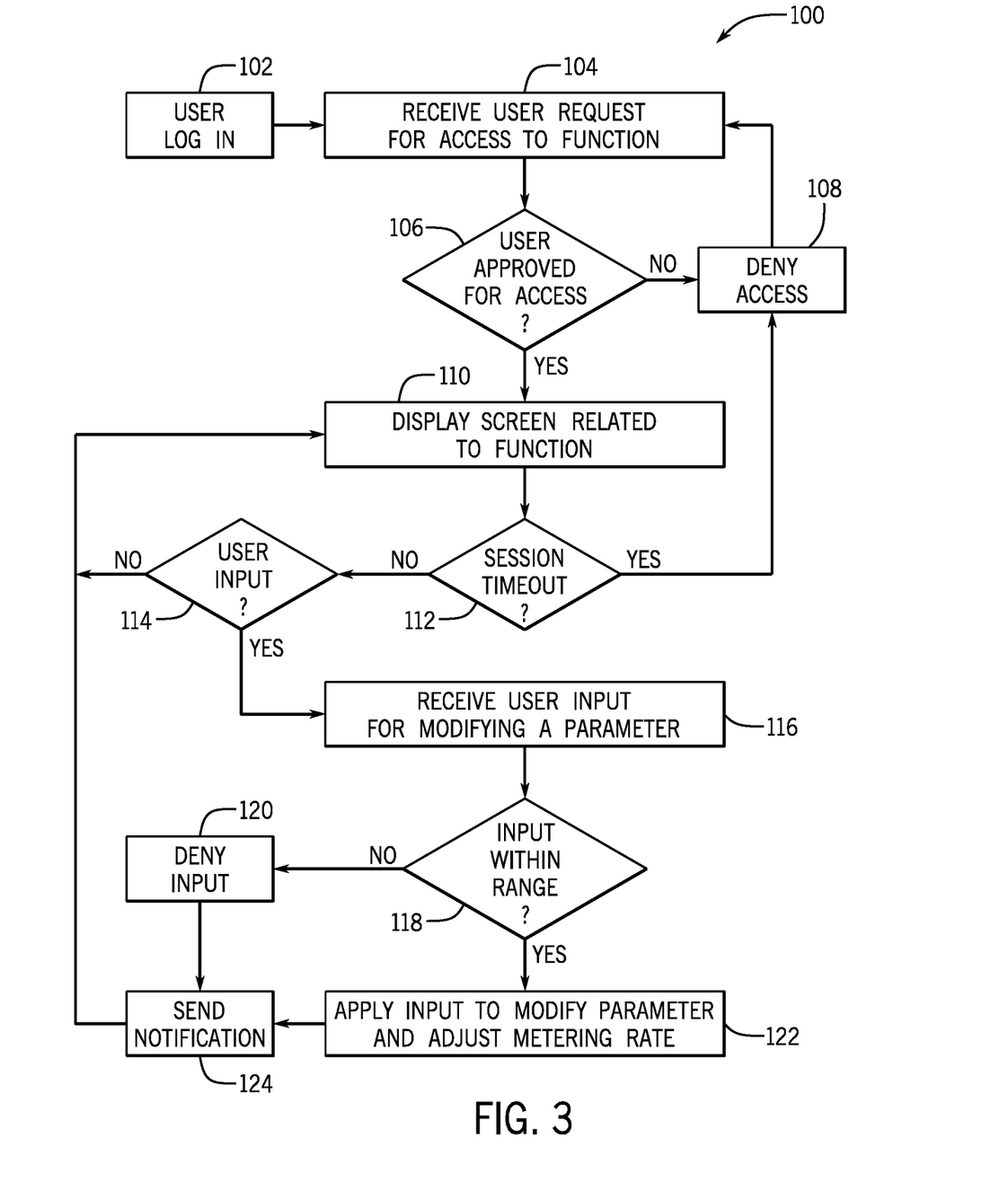
FIG. 3 is a flow chart for execution of the control system of FIGS. 1 and 2 in accordance with an aspect of the present invention.

With additional reference to FIG. 3, a process 100 for distributing particulate material to an agricultural field, which may be executed by the controller 42, is provided in accordance with an aspect of the present invention. At step 102, typically before commencement of field operations, an operator or user may log into the control system, such as via the I/O 44 and/or the wireless communications system 65.

Figure 4:
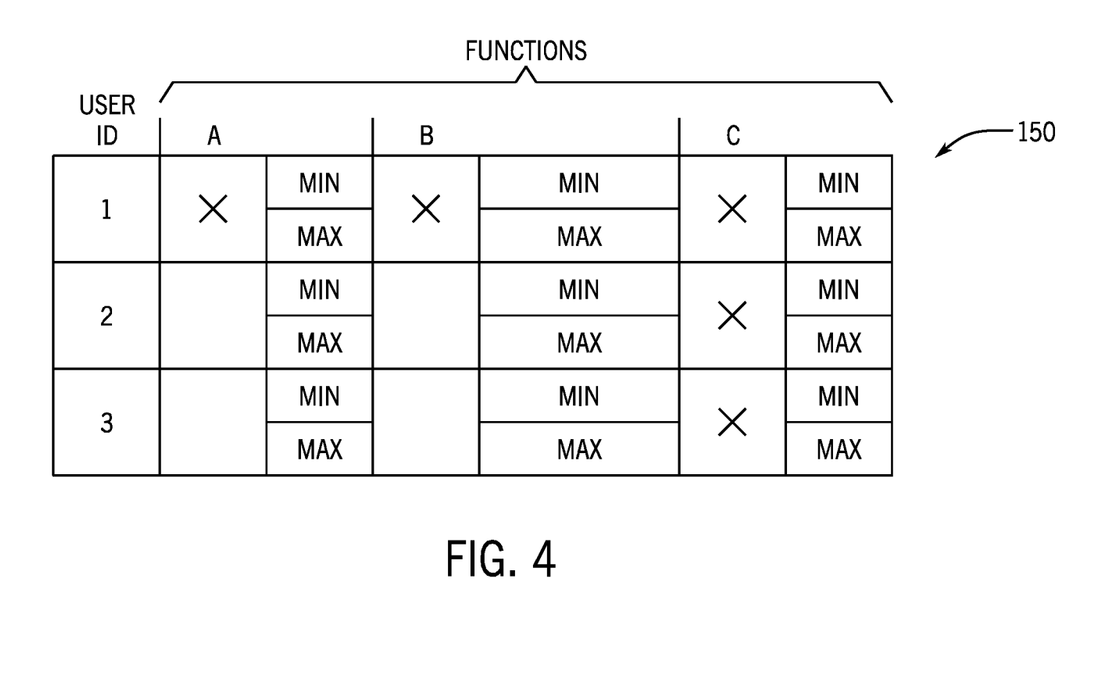
FIG. 4 is an exemplar data structure indicating permission levels for a parameters related to various functions, for various operators, in accordance with an aspect of the present invention.

The operator can log in using an operator ID and/or password, At step 104, perhaps during field. operations, the operator can attempt to access a screen or function predetermined as having parameters effecting dispensing of particulate material. For example, the operator might attempt to access a calibration screen for meter and/or ground speed calibration functions, or a main setup screen for configuring the product distribution system, such as the number of distribution headers 30, the number of primary lines 26, the number of secondary lines 32, a dimension of the product distribution system, such as tool or section width, and the like. At decision step 106, the process can determine whether the operator is approved for accessing the screen and/or function. With additional reference to FIG. 4, the process can reference a data structure 150, such as the exemplar look up table, indicating permission levels for various functions, for various operators. For example, an operator having a User ID "1" might be approved for functions "A," "B" and "C" (which could correspond to modifying calibration settings, modifying configuration settings and increasing/decreasing particulate material dispensing rates, respectively), as indicated by an "X" in each cell. However, other users having User ID's "2" and "3" might be approved for only functions "C" (corresponding to increasing/decreasing particulate material dispensing rates), as indicated by an "X" in that cell, while be restricted from other functions "A" and "B" (corresponding to modifying calibration settings and modifying configuration settings, respectively), as indicated by an absence of "X" in those cells. If the operator is not approved for access to the function being requested ("No"), such as operator 2 not being approved for access to function "A," then the operator is denied access at step 108, and the process returns to step 104. However, if the operator is approved for access to the function being requested ("Yes"), such as operator 2 being approved for access to function "C," then the process can grant access to the operator for function at step 110, such as by displaying a screen to the I/O 44 with parameters related to the function. Accordingly, the process can determine the level of access for each operator, on an individual basis, by authenticating a password at step 102 and referencing a data structure 150 at step 106. Moreover, upon failing to determine the level of access for an operator, the process can maintain parameters without applying further input.

After granting access to the function at step 110, the process can continue to an decision step 112 in which it is determined whether a timeout period has expired. The timeout period could be configured as an elapsed time, such as 10 minutes or 1 day, or alternatively, could be configured based on a sensed activity, such as turning off the machine. If the time has expired ("Yes"), the process can return to step 108 in which the operator is denied further access, then again to step 104. However, if the time has not expired ("No"), the process can continue to decision step 114 in which the user can provide input for the function, such as modifying a parameter affecting the metering rate. At decision step 114, if the operator does not provide input for the function ("No"), the process can return to step 110 in which access to the function is continued, then decision step 112 in which the time period is monitored. However, if the operator does provide input for the function ("Yes"), the process can continue to step 116 in which the input for the function is received. The input can be to modify a parameter affecting the metering rate. However, the process limits the operator to a level of access sufficient for modifying the parameter by restricting access to that which is permitted by the data structure 150.

After step 116 in which input is received, the process can compare the input to a predetermined range. Referring again to FIG. 4 by way of example, parameters for each function can include "MIN" and/or "MAX" values in which particular users are allowed to adjust the parameter. The "MIN" and/or "MAX" values can be different for each operator. For example, the function "A," which could correspond to calibration settings, may include a parameter corresponding to a metering calibration parameter, such as a parameter of 125 lbs. of particulate material distributed for every 100 revolutions of the meter roller 41. The parameter can include a corresponding "MIN" value of 100 lbs. per revolution, and a corresponding "MAX" value of 150 lbs. per revolution, either of which the operator cannot exceed with input. If at decision step 118 the input for modifying the parameter is within the predetermined range for the operator ("Yes"), the process can apply the input to modify the parameter at step 122. Then, the process can optionally send a notification through the wireless communications system 65, indicating the change to an agricultural manager, after applying the input to modify the parameter. The process can then return to step 110 in which access to the function is continued.

However, if at decision step 118 the input for modifying the parameter is not within the predetermined range for the operator ("No"), the process can instead deny the input at step 120, without applying the input to modify the parameter. Then, the process can optionally send a notification through the wireless communications system 65, indicating the attempted change to an agricultural manager. The process can then return to step 110 in which access to the function is continued.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A system for distributing particulate material to an agricultural field, comprising:
   a meter module configured to dispense particulate material through a product distribution system, the meter module being controllable to dispense the particulate material at a metering rate that is adjustable;
   an input source configured to receive an input from an operator for a selected function and for modifying a parameter associated with the selected function and effecting dispensing of the particulate material; and
   a controller in communication with the meter module and the input source, the controller executing a program stored in a non-transient medium to:
   determine an accessibility of the selected function based on the operator providing the input;
   upon determining the accessibility of the selected function, determine an input range for the parameter associated with the selected function based on the operator providing the input;
   compare the input to the input range; and
   upon confirming the input to be within the input range, apply the input to modify the parameter.

2. The system of claim 1, wherein determining the accessibility of the selected function based on the operator comprises authenticating a password provided by the operator.

3. The system of claim 1, wherein the accessibility of the selected function and the input range are determined by referencing a data structure indicating, for a plurality of operators, accessibility for a plurality of functions and minimum and maximum values for respective parameters associated with the plurality of functions.

4. The system of claim 1, further comprising, upon failing to determine the accessibility of the selected function, executing to maintain the parameter without applying the input.

5. The system of claim 1, wherein the parameter relates to at least one of a meter calibration for the meter module and a ground speed calibration.

6. The system of claim 1, wherein the parameter relates to a configuration of the product distribution system, wherein the configuration is selected from the group consisting of: a number of distribution headers; a number of distribution lines; and a dimension of the product distribution system.

7. The system of claim 1, wherein the parameter relates to a selection of particulate material.

8. The system of claim 1, further comprising a display for displaying the parameter, wherein the controller further executes to authenticate a password provided by the operator before displaying the parameter.

9. The system of claim 8, wherein the input source is combined with the display as a Human Machine Interface (HMI).

10. The system of claim 1, further comprising a wireless communications system, wherein the controller further executes to send a notification through the wireless communications system after executing to apply the input to modify the parameter.

11. The system of claim 1, further comprising a wireless communications system, wherein the input source is configured to receive the input from a remote operator through the wireless communications system.

12. A method for distributing particulate material to an agricultural field, comprising:
   receiving, via an input source, an input from an operator for a selected function and for modifying a parameter associated with the selected function and effecting dispensing of the particulate material, wherein a meter module is configured to dispense the particulate material through a product distribution system, the meter module being controllable to dispense the particulate material at a metering rate that is adjustable;
   determining, via a controller having a memory and a processor, an accessibility of the selected function based on the operator providing the input;
   upon determining the accessibility of the selected function, determining, via the controller, an input range for the parameter associated with the selected function based on the operator providing the input;
   comparing, via the controller, the input to the input range; and
   upon confirming the input to be within the input range, applying, via the controller, the input to modify the parameter.

13. The method of claim 12, wherein determining the accessibility of the selected function based on the operator comprises authenticating, via the controller, a password provided by the operator.

14. The method of claim 12, wherein the accessibility of the selected function and the input range are determined, via the controller, by referencing a data structure indicating, for a plurality of operators, accessibility for a plurality of functions and minimum and maximum values for respective parameters associated with the plurality of functions.

15. The method of claim 12, further comprising sending, via the controller, a notification through a wireless communications system after applying the input to modify the parameter.

16. A system for distributing particulate material to an agricultural field, comprising:
an air cart comprising:
a product storage tank configured to store particulate material; and
a meter module configured to dispense the particulate material from the product storage tank to a primary product distribution line, the meter module being controllable to dispense the particulate material at a metering rate that is adjustable;
an agricultural implement comprising:
a product distribution header configured to receive the particulate material from the air cart through the primary product distribution line; and
a plurality of row units, each row unit being configured to receive the particulate material from the product distribution header through a secondary product distribution line and deposit the particulate material to the agricultural field;
an input source configured to receive an input from an operator for a selected function and for modifying a parameter associated with the selected function and effecting dispensing of the particulate material; and
a controller in communication with the meter module and the input source, the controller executing a program stored in a non-transient medium to:
determine an accessibility of the selected function based on the operator providing the input;
upon determining the accessibility of the selected function, determine an input range for the parameter associated with the selected function based on the operator providing the input;
compare the input to the input range; and
upon confirming the input to be within the input range, apply the input to modify the parameter.

17. The system of claim 16, further comprising a wireless communications system, wherein the controller further executes to send a notification through the wireless communications system after executing to apply the input to modify the parameter.

18. The system of claim 16, further comprising, upon failing to determine the input to be within the input range, executing to maintain the parameter without applying the input.

19. The system of claim 1, further comprising, upon failing to determine the input to be within the input range, executing to maintain the parameter without applying the input.

20. The method of claim 12, further comprising, upon failing to determine the input to be within the input range, maintaining, via the controller, the parameter without applying the input.

* * * * *